United States Patent [19]

Mosley

[11] Patent Number: 5,743,426
[45] Date of Patent: Apr. 28, 1998

[54] REUSABLE SHIPPING AND PACKAGING CONTAINER

[76] Inventor: James William Mosley, 1610 Gatehouse Cir., N #B1, Colorado Springs, Colo. 80904

[21] Appl. No.: 680,797
[22] Filed: Jul. 16, 1996
[51] Int. Cl.⁶ ........................................................ B65D 1/24
[52] U.S. Cl. ............................ 220/522; 220/1.5; 220/212; 220/334
[58] Field of Search ........................ 220/1.5, 4.22, 220/212, 521, 522, 334, 366.1, 367.1

[56] References Cited

U.S. PATENT DOCUMENTS

| | | |
|---|---|---|
| 2,893,588 | 7/1959 | Martin . |
| 4,024,731 | 5/1977 | Branscum ........................... 220/522 X |
| 4,050,604 | 9/1977 | Flanders . |
| 4,150,746 | 4/1979 | Buglione ........................... 220/522 X |
| 4,369,883 | 1/1983 | Stravitz ........................... 206/387 |
| 4,984,687 | 1/1991 | Hanna et al. ..................... 220/522 X |
| 5,170,933 | 12/1992 | Perry . |
| 5,265,749 | 11/1993 | Zutler ........................... 220/4.24 |
| 5,287,970 | 2/1994 | Weldt . |
| 5,388,714 | 2/1995 | Zutler ........................... 220/4.24 |
| 5,447,041 | 9/1995 | Piechota ........................... 220/521 X |

*Primary Examiner*—Stephen Cronin
*Attorney, Agent, or Firm*—Patent & Trademark Services; Thomas Zack; Joseph H. McGlynn

[57] ABSTRACT

A plastic reusable packing and shipping container having an inside lid pocket for computer readable instructions. Toothed lid corners engaged toothed container body corners to form a tight seal. The lid may be hinged to the container's body and the interfacing edges and teeth covered by an adhesive sealing tape. Once, the original container is not longer usable, it can be melted down and recycled into a different sized, shaped, or both, container for a variety of different uses.

6 Claims, 1 Drawing Sheet

REUSABLE SHIPPING AND PACKAGING CONTAINER

BACKGROUND OF THE INVENTION

Shipping containers of various sizes and shapes have been utilized for a considerable time. In many cases these containers were made of paper products like cardboard or wood. After they reached their intended destination most were simply discharged resulting in a waste of valuable resources and an environmental disposal problem. Reusing these shipping and packaging containers would remedy these deficiencies. The present invention proposes using a new container whose plastic material can be reused and, when not long acceptable for its original purpose, recycled by reformulating the material and changing its size and shape to provide a different remanufactured container. Appropriate computer or machine readable destination addresses and shipping instructions can be included in pockets built into both types of containers.

DESCRIPTION OF THE PRIOR ART

Various types of packaging and shipping containers have been developed and used in the past. One example is found in U.S. Pat. 2,893,588 to Martin wherein a drawn sheet material pallet is used as the base of a heavy duty container. Metal or plastic materials may be used to make the container. Others (e.g., U.S. Pat. Nos. 4,050,604 and 5, 170,933 to Flanders and Perry, respectively) have disclosed disassembleable reusable containers. Some plastic containers, such as in U.S. Pat. No. 5,287,970 to Weidt, have pocket-like free spaces 7 (column 5, lines 24–37). None, however, disclose reusable plastic containers having instruction storage pockets which can be recycled and reformulated as disclosed herein.

SUMMARY OF THE INVENTION

A reusable plastic shipping container having an inside lid pocket to insert computer readable destination and shipping instructions. Once the container is no longer acceptable for reuse, it can be melted down and remanufactured to a different sized or shaped, or both, container. Flush lid teeth on outside corner edges engage body teeth and are covered by a protective adhesive tape.

It is the primary object of this invention to provide an improved reusable packing and shipping container.

Another object is to provide a container having its own computer readable instructions within an internal pocket.

Still another object is to provide a container whose material can be remanufactured and reformulated into different sized or shaped, or both, containers.

DESCRIPTION OF THE PREFERRED EMBODIMENT

Figure 1:
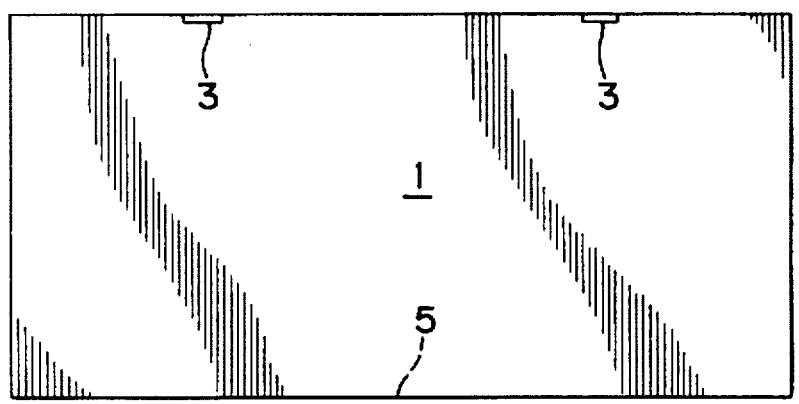
FIG. 1 is a top view of the lid for the container's preferred embodiment.

FIG. 1 is a top view of the preferred embodiment of the plastic rectangular container's lid 1. Located at the rear are at least two plastic hinges 3 which permit the lid to be opened from the main container body. Internal of the lid's front face is a pocket 5 which can be accessed when the lid is opened. Normally, computer or machine readable instructions for shipping or other purposes may be placed on a data recorded media within this pocket by the shipper.

Figure 2:
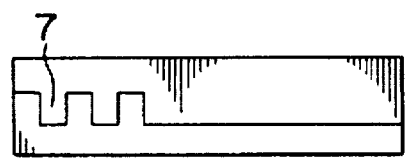
FIG. 2 is a side view of the lid shown in FIG. 1.

FIG. 2 is a side view of the lid 1 shown in FIG. 1. Shown in this view are several flush mounted square-shaped downwardly facing teeth 7 located on two of the lid's opposite front corners—only one set of teeth for a corner being shown. These teeth are sized, spaced and shaped to engage complimentarily sized, shaped and spaced flush mounted teeth on the container's body corners to form a locking relationship between the upper container lid and its lower container body.

Figure 3:
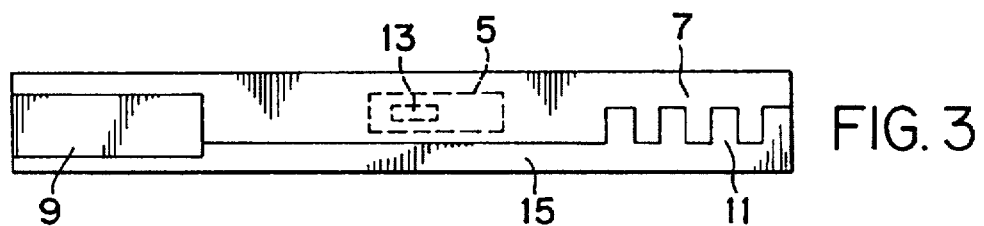
FIG. 3 is a front view of the lid shown in FIG. 1.

FIG. 3 is a front view of the lid 1 shown in FIG. 1. In this view the container is being prepared for shipment with the items to be shipped having been previously placed within it. Also shown in this figure are the upwardly facing flush mounted body teeth 11 which engage the downwardly facing lid teeth 7 to form a tight locking seal for the lid. The process of sealing is incomplete as the lid's corner teeth 7 and engaging body teeth 11 are both exposed on the right corner but completely covered by an adhesive tape 9 on the left corner. When finished and ready for shipment all flush mounted teeth both on the container's lid and body will be covered by the adhesive sealing tape. Behind the lid's front surface is the internal pocket 5 shown in dotted line format. This pocket may take many forms such as a zippered closed pocket, such as conventionally found in a suitcase, or is may be a bag-like opened pocket. Whatever is configuration, within it are computer or machine readable instructions either on some data recordable medium 13, such as paper or on a compact/floppy disk in a digitally (binary) encoded format. These shipper prepared instructions convey all necessary destination and shipping data to the receiver. Also, shown in FIG.3 is upper part of the container's body 15 which interfaces with the lid and supports the upwardly facing teeth 11. At the interface between the lid and upper body container the adhesive sealing tape 9 may be applied to completely or partially surround the interface.

Figure 4:
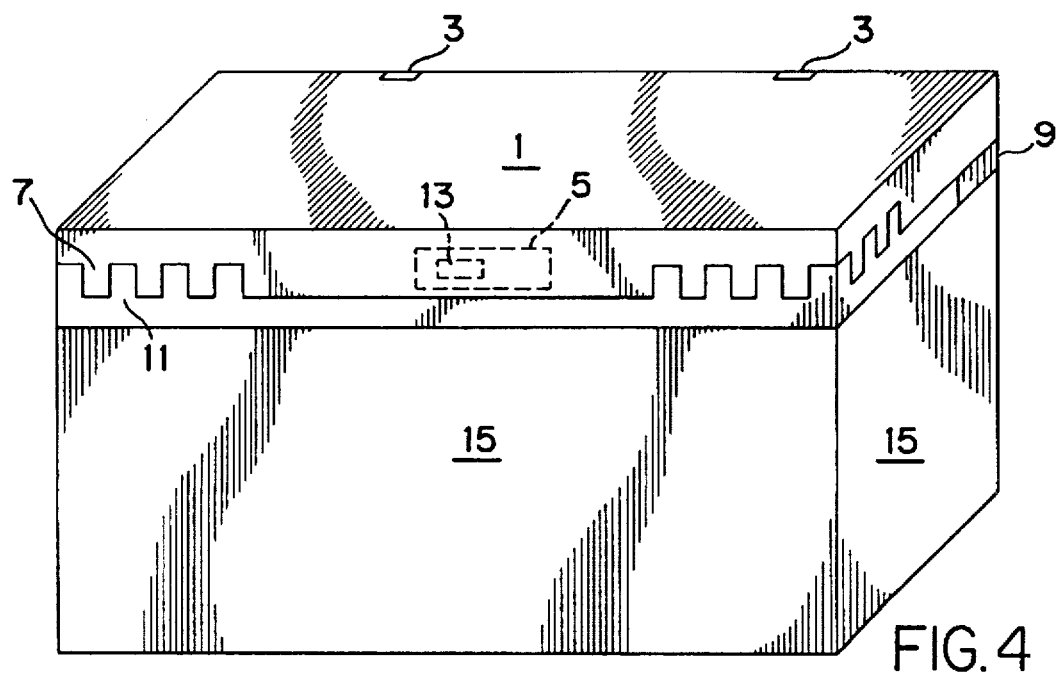
FIG. 4 is a perspective view of the FIG. 1. container with its lid placed on it.

FIG. 4 is a perspective view of the FIG. 1. container with its lid 1 placed on it and with the tape 9 covering the toothed corners and all interfacing lid/body areas as would be the case when ready for shipment. The downwardly facing lid corner teeth (7) engage the upwardly facing container body teeth 11 and are also covered by the tape 9. Within the lid's front interior pocket 5 are the machine readable instructions shown here contained on a plastic disk 13 having a digitally (binary) encoded format. The container's main body 15 is opened at its top wherein it engages the lid and has four sides and a lower bottom. The top's of the lid's two built-in plastic hinges 3, which engage and are fixed to the body's upper rear portion, are also shown.

It is contemplated that some of the containers will be reused more or less continuously for an extended time period. Afterwards when they are not longer acceptable for use due to damage incurred such as cracks, broken teeth or hinges, etc. At that time their plastic material is such that it can be melted down are remanufactured or reformulated into new recycled containers. These new recycled containers can take almost any shapes, sizes, or both, and be used to ship many articles. Examples of uses for such recycled containers include, but are not limited to, shoe boxes, audio or video tape containers, etc.

Although the Reusable Shipping And Packaging Container and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A reusable plastic shipping container comprising:

an upper openable lid having an inside lid pocket, said pocket adapted to receive a data recorded medium having computer readable instructions thereon;

said lid also having corner flush mounted teeth; and a main container body on which said lid is fitted, said body having flush mounted corner teeth which can engage said lid's teeth in a sealing relationship.

2. The invention as claimed in claim 1, also including an adhesive tape covering said engaging lid and body teeth.

3. The invention as claimed in claim 2, wherein said lid teeth are downwardly facing and engage upwardly facing body mounted teeth.

4. The invention as claimed in claim 3, also including a hinged mount for mounting the container's lid to the container's body.

5. The invention as claimed in claim 4, wherein said pocket is located on the lid's front inner surface opposite to the hinged mount.

6. The invention as claimed in claim 5, also including a plastic disk located in said lid's pocket capable of recording said computer readable instructions in a digitally encoded binary format.

* * * * *